United States Patent [19]

Marquis

[11] Patent Number: 4,697,150
[45] Date of Patent: Sep. 29, 1987

[54] TWO ELECTRODE WELL LOGGING SYSTEM FOR MEASURING RESISTIVITY OF SUBSURFACE FORMATIONS

[75] Inventor: Gerald L. Marquis, Houston, Tex.

[73] Assignee: Western Atlas International, Inc., Houston, Tex.

[21] Appl. No.: 786,551

[22] Filed: Oct. 11, 1985

[51] Int. Cl.$^4$ ............................ G01V 3/26; G01V 3/18
[52] U.S. Cl. ...................................... 324/373; 324/347
[58] Field of Search ............... 324/347, 354, 366, 373, 324/374, 355, 357

[56] References Cited

U.S. PATENT DOCUMENTS

| | | | |
|---|---|---|---|
| 2,347,794 | 5/1944 | Piety | 324/373 |
| 2,712,628 | 7/1955 | Doll | 324/373 |
| 2,712,629 | 6/1955 | Doll | 324/374 |
| 2,988,692 | 6/1961 | Mann | 324/373 |
| 3,031,612 | 4/1962 | Easterling | 324/373 |
| 3,060,373 | 10/1962 | Doll | 324/374 |
| 3,388,324 | 6/1968 | Sloughter | 324/374 |
| 3,423,671 | 1/1969 | Vezin | 324/374 X |
| 3,488,574 | 1/1970 | Tanguy | 324/373 |
| 3,521,154 | 7/1970 | Maricelli | 324/374 |
| 4,019,125 | 4/1977 | Daniel | 324/374 |
| 4,087,739 | 5/1978 | Vieiro | 324/374 |
| 4,120,353 | 10/1978 | Roesner | 166/66.4 |
| 4,432,143 | 2/1984 | Moriarty et al. | 33/178 F |

FOREIGN PATENT DOCUMENTS

| | | | |
|---|---|---|---|
| 685727 | 5/1964 | Canada | 324/373 |
| 0441543 | 12/1974 | U.S.S.R. | 324/374 |

*Primary Examiner*—Reinhard J. Eisenzopf
*Assistant Examiner*—Warren S. Edmonds
*Attorney, Agent, or Firm*—Patrick H. McCollum

[57] ABSTRACT

A well logging instrument for measuring the resistivity of relatively thin formation beds. A well logging instrument includes an elongated body member, serving as a single guard electrode, and a point current emitting measure electrode recessed therein. The instrument is lowered into a borehole and urged into contact with the wall of the borehole. A measure current emanates from the measure electrode into the formation for determining the resistivity thereof.

8 Claims, 5 Drawing Figures

TWO ELECTRODE WELL LOGGING SYSTEM FOR MEASURING RESISTIVITY OF SUBSURFACE FORMATIONS

BACKGROUND OF THE INVENTION

This invention relates generally to a system for measuring the resistivity of subsurface earth formations. More specifically, the invention relates to methods and apparatus for measuring with an increased depth of investigation, the resistivity in relatively thin formation beds or zones.

Electric well logging of subsurface earth formations is conducted by various types of instruments common in the art. One such instrument is a focused or guard electrode system. This instrument is designed to produce a measurement of formation resistivity in boreholes containing conductive drilling fluids. Examples of such instruments are illustrated in U.S. Pat. Nos. 2,347,794 and 2,712,628.

The focused electrode instrument has a cylindrical current electrode positioned between two relatively long guard electrodes. A survey current emits from the center electrode. An auxiliary current of the same polarity is applied to the guard electrodes. The current to the guard electrodes is automatically and continuously adjusted to maintain a zero voltage potential difference between the center electrode and guard electrodes, focusing the current emanating from the center, current electrode laterally into the earth formation. A drop in potential is created by the flow of survey current through the surrounding formation to a remote current return electrode. This potential difference is related to the resistivity of the formation.

This form of instrument has proven to be highly reliable in measuring formation resistivity of zones having a bed thickness greater than two feet. However, this design has provided less than satisfactory results in measuring resistivity in formation zones having a thickness less than two feet (relatively thin beds) and particularly when attempting to measure the resistivity of a thin formation zone lamenated between formation zones having a high resistivity contrast, such as a sand zone, having a relatively high resistivity, laminated between two shale zones, having a substantially lower resistivity, or vice versa. One proposed method to modify this instrument to obtain better measurements of the resistivity of these thin beds is to reduce the length of the cylindrical, center current emitting electrode from its normal length of approximately six inches. However, it can be shown that further reducing the electrode length under six inches does not materially improve the thin bed resolution due to the spreading of the measure current in the borehole before entering the earth formations. Thus, this modification does not materially enhance thin bed resolution.

This and other disadvantages are overcome by the present invention which provides methods and apparatus for measuring the resistivity in relatively thin formation beds, particularly when laminated between formation zones having resistivity contrasts.

SUMMARY OF THE INVENTION

A well logging instrument for measuring the resistivity of relatively thin formation zones comprises an elongated body member, functioning as a single guard electrode, and a point current emitting measure electrode mounted therein. The instrument is lowered into the borehole and one face of the instrument, having the measure electrode therein, is forced against the wall of the borehole. Current is emitted from the measure electrode and current is also supplied to the guard electrode so as to maintain the potential difference between these electrodes at substantially zero. A record of the formation resistivity is made by monitoring variations in the potential difference between the measure electrode and a point at a reference potential.

DETAILED DESCRIPTION OF THE PREFERRED EMBODIMENT

Figure 1:
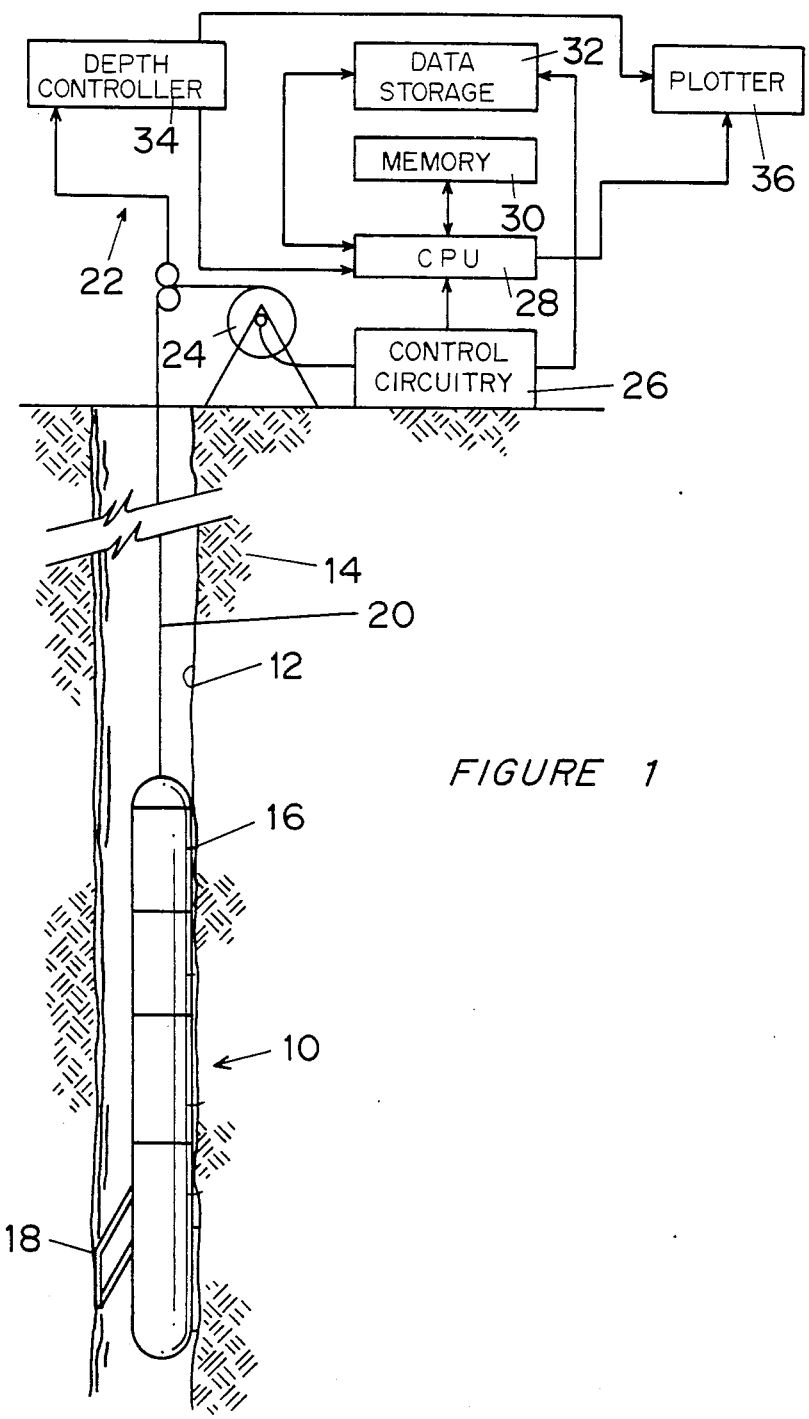
FIG. 1 is a simplified functional representation of an embodiment of the present invention.

Referring now to the drawings in more detail, FIG. 1 illustrates a resistivity measuring instrument 10, in accordance with the present invention, disposed within a borehole 12 penetrating an earth formation 14. Instrument 10 includes an elongated body member 16, serving as a single guard electrode constructed of a suitable conductive material, having a current emitting electrode (illustrated in more detail in FIG. 2) disposed therein. One side of instrument 10, having a current emitting electrode mounted therein, is pushed into contact with the subsurface earth formation by decentralizer member 18. Instrument 10 is supported within borehole 12 by cable 20 containing electrical conductors (not illustrated) for communicating electrical signals between instrument 10 and the surface processing system, illustrated generally at 22 located at the earth's surface. Cable 20 is attached to a drum 24 at the earth's surface in a manner familiar to the art. Instrument 10 is caused to traverse borehole 12 by spooling cable 20 on to or off of drum 24.

Surface processing system 22 includes such electronic circuitry necessary to operate instrument 10 and to process the data therefrom. Control circuitry 26 contains such power supplies as are required for operation of instrument 10 and further contains such electronic circuitry as is necessary to process and normalize the signals in a conventional manner to yield generally continuous records of data pertaining to the resistivities of the formations surrounding borehole 12.

Surface processing system 22 may also include such equipment as will facilitate machine implementation of the data processing and recording. Central processing unit (CPU) 28 may be of various forms but preferably is an appropriate digital computer programmed to process data from instrument 10. Memory unit 30 and data storage unit 32 are each of a type to cooperatively interface with CPU 28 and/or control circuitry 26. Depth controller 34 determines the longitudinal movement of instrument 10 within borehole 12 and communicates a signal representative of such movement to CPU 28 and plotter 36. Plotter 36 may be of a variety of forms suitable for receiving signals from CPU 28 and depth controller 34 and recording these signals as a function of depth.

Figure 2:
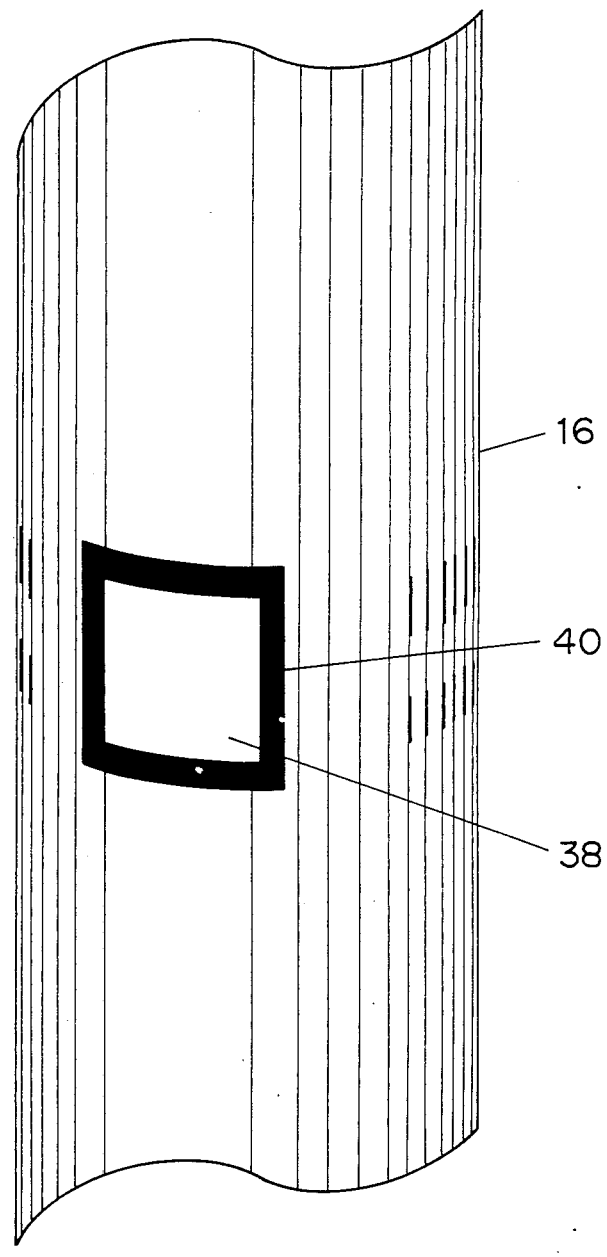
FIG. 2 is an isometric view of a portion of the well logging instrument of FIG. 1.

Referring further to FIG. 2 therein is illustrated in isometric view a section of body member 16 having current emitting measure electrode 38 mounted therein. Measure electrode 38 is mounted within body member 16 having the face of measure electrode 38 recessed from the face of body member 16. Electrical insulator 40 isolates electrode 38 from body member 16 which services as a single guard electrode surrounding electrode 38 on all sides except the face exposed to the formation. In the preferred embodiment measure electrode 38 consists of a square disk of conductive material having a dimension of approximately two inches. However, it should be recognized that measure electrode 38 could have other configurations, for example, circular or rectangular.

Figure 3A:
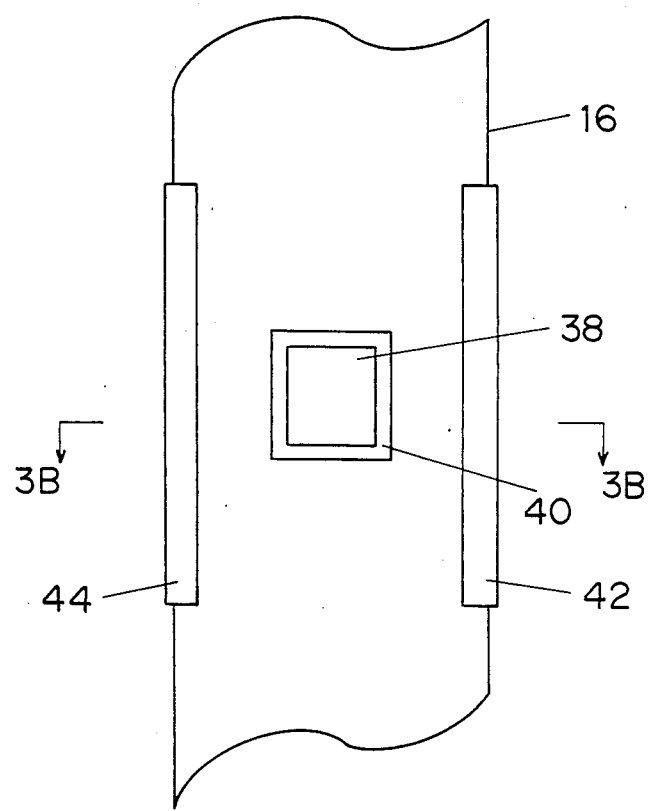
FIGS. 3A and 3B are views of an alternate embodiment of the well logging instrument of FIGS. 1 and 2.
Figure 3B:
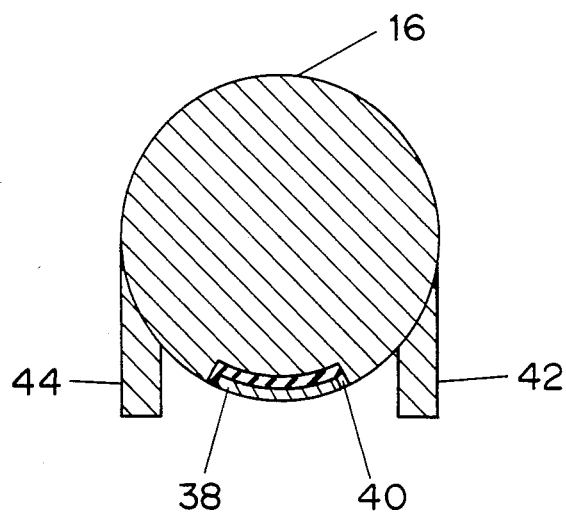

Referring now to FIGS. 3A and 3B therein is illustrated one modification of the apparatus illustrated in FIG. 2. As illustrated in FIG. 3 supplemental guard electrode members 42 and 44 are attached to the main guard member, body member 16. Supplemental guard electrode members 42 and 44 each comprise an elongated section of conductive material coupled to and extending tangentially from body member 16 so that when body member 16 is pressed against the borehole wall supplemental guard electrodes members 42 and 44 will contact the wall and serve to further constrain the measure current emitted from measure electrode 38 and further reduce the effect of the borehole on the measurements of formation resistivity. In this configuration it is not necessary to recess the measure electrode provided supplemental guard electrodes 42 and 44 extend beyond the perphery of body member 16.

Figure 4:
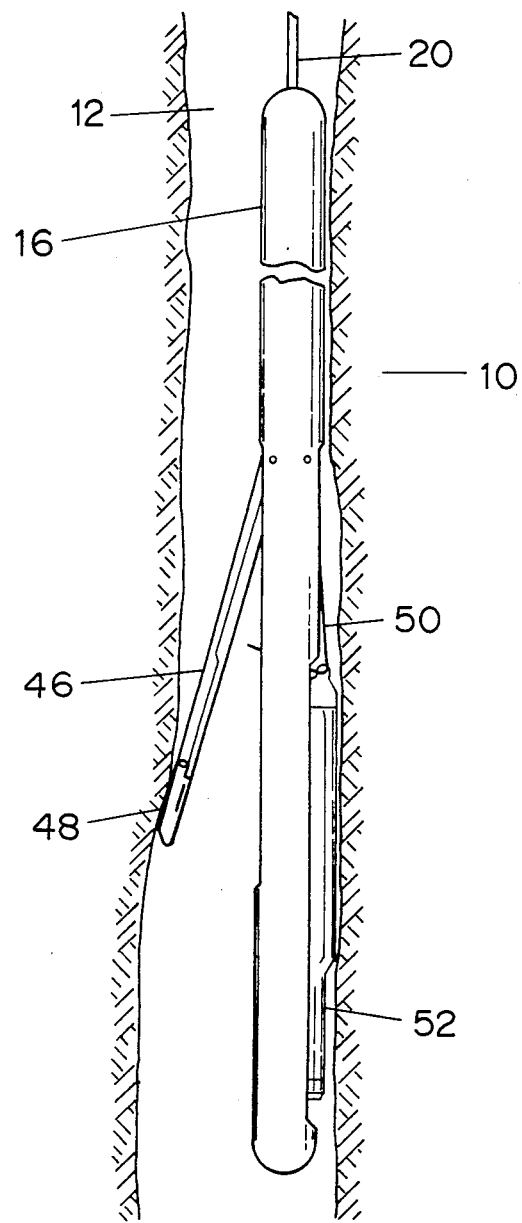
FIG. 4 is a simplified functional representation of an alternate embodiment of the present invention.

Referring now to FIG. 4 therein is illustrated another embodiment of the present invention. The instrument 10 comprises a generally cylindrical elongated body member 16 in which is located a collapsible linkage assembly. A extendable arm 46 is pivotally connected to body member 16 and has at its outmost end a contact pad 48. Arm 46 is arranged to be folded into an opening in the wall of body member.

Pivotally attached to body member 16 is arm member 50. The lower end of extended arm 50 is pivotally connected to pad member 52. Pad member 52 contains the current emitting measure electrode which is mounted in the face of pad member 52 in a manner similar to that previously illustrated. The bottom portion of pad member 52 contains a guide opening formed therein into which projects a limit peg for limiting the outward extension of pad member 52. In this embodiment body member 16 and pad member 52 serve as the guard electrode. A complete description of the apparatus and its mechanical operation can be found in U.S. Pat. No. 4,120,353, issued Oct. 17, 1978 and assigned to the assignee of the present invention, which is incorporated herein by reference. Yet another suitable mechanical configuration can be found in U.S. Pat. No. 4,432,143, which is incorporated herein by reference.

In the operation of the instruments illustrated in the Drawings, instrument 10 is lowered into borehole 12 and decentralized so that body member 16, or in the case of the instrument of FIG. 4 pad member 52, is moved against the wall of borehole 12. Current is emitted from measure electrode to the formation. The measure current emitted from measure electrode 38 is prevented from flowing in any direction other than directly into the formation. This is accomplished by substantially surrounding measure electrode 38 with a guard electrode (body member 16 of the instruments of FIGS. 1 and 3 and body member 16 and pad member 52 of the instrument of FIG. 4) which causes measure current to flow only perpendicular to the axis of instrument 10.

To control measure current flow a current of constant intensity is supplied to measure electrode 38. A controlled current of the same polarity as at measure electrode is supplied to the guard electrode. The intensity of the controlled current applied to the guard is automatically and continuously adjusted to maintain zero potential difference between measure electrode 38 and guard electrode 16 and pad member 52. The current emanating from measure electrode 38 is maintained constant and the measured apparent resistivity is directly proportional to the potential of the measure electrode 38. Another embodiment consists of applying a controlled constant voltage current source to guard electrode 16 and pad member 53. Measure electrode 38 is maintained at essentially the same potential as the guard electrode 16 either thru electronic means or by connecting it to the guard electrode with a very small resistor. The current flowing out of measure electrode 38 is measured. The apparent resistivity of the formation is inversely proportional to this measured current.

The zero potential difference between measure electrode and guard electrode prevents current emanating from measure electrode 38 to flow along the borehole even when it contains highly saline mud. Thus, the measure current will assume a single field substantially perpendicular to the wall of borehole 12.

Many modifications and variations besides those specifically mentioned herein may be made in the techniques and structure described herein and depicted in the accompanying drawings without departing substantially from the concept of the present invention. Accordingly, it should be clearly understood that the forms of the invention described and illustrated herein are exemplary only, and are not intended as limitations on the scope of the present invention.

The embodiments of the invention in which an exclusive property or privilege is claimed are defined as follows:

1. Apparatus for obtaining indications of the electrical resistivity of relatively thin layers of earth formations traversed by a borehole containing relatively conductive liquids, including a two electrode array to be lowered into a borehole comprising:
   an elongated, tubular instrument body member, said entire instrument body member forming an elongated guard electrode member;
   a measure electrode mounted within and electrically insulated from said guard electrode member, said measure electrode for emitting a survey current into said earth formations;
   means for decentralizing within said borehole said entire guard electrode member and for urging said guard electrode member into contact with the wall of said borehole; and
   a pair of elongated auxiliary guard electrodes mechanically mounted on said guard electrode, said auxiliary guard electrodes mounted parallel to the longitudinal axis of said guard electrode and said auxiliary guard electrodes being in electrical contact with said guard electrode member.

2. The apparatus of claim 1 wherein said auxiliary guard electrodes further comprise first and second elongated members extending tangentially from said guard electrode member and extending beyond the outer periphery of said guard electrode member.

3. A two electrode system for use with a well logging instrument for obtaining measurements of the electrical resistivity of relatively thin layers of earth formations traversed by a borehole containing relatively conductive fluids comprising:
- an elongated instrument body member, said entire instrument body member serving as a single guard electrode;
- a point measure electrode mounted within and electrically isolated from said guard electrode, wherein said guard electrode surrounds said point measure electrode except in the direction of said wall of said borehole;
- means for decentralizing within said borehole said entire guard electrode and for urging at least a portion of said guard electrode, said portion containing said measure electrode, into contact with the wall of said borehole; and
- first and second elongated auxiliary guard electrodes mechanically mounted on said guard electrode in fixed relation proximate said measure electrode, said auxiliary guard electrodes mounted parallel to the longitudinal axis of said body member and parallel to one another and electrically interconnected to said body member.

4. The electrode system of claim 3 wherein said elongated auxiliary guard electrodes further comprise first and second elongated conductive members extending from said guard electrode toward said wall of said borehole.

5. The electrode system of claim 4 wherein said elongated auxiliary guard electrodes stand-off said guard electrode from said wall.

6. The electrode system of claim 3 wherein said point measure electrode is recessed within the face of said body member.

7. The electrode system of claim 6 said guard electrode further comprising a pad member portion mechanically coupled to and partially extendible from said body member, said point measure electrode mounted within said pad member portion.

8. The electrode system of claim 7 further comprising means for limiting the outward extension of said pad member portion to retain only a portion of said pad member within said body member.

* * * * *